United States Patent
Hamilton, II et al.

(10) Patent No.: US 7,174,359 B1
(45) Date of Patent: Feb. 6, 2007

(54) APPARATUS AND METHODS FOR SEQUENTIALLY SCHEDULING A PLURALITY OF COMMANDS IN A PROCESSING ENVIRONMENT WHICH EXECUTES COMMANDS CONCURRENTLY

(75) Inventors: Rick Allen Hamilton, II, Charlottesville, VA (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 09/710,921

(22) Filed: Nov. 9, 2000

(51) Int. Cl.
*G06F 15/16* (2006.01)
(52) U.S. Cl. ................................... 709/201
(58) Field of Classification Search ................ 709/253; 718/102, 103
See application file for complete search history.

(56) References Cited

U.S. PATENT DOCUMENTS

| | | | | |
|---|---|---|---|---|
| 4,800,521 A * | 1/1989 | Carter et al. | ................ | 718/102 |
| 4,925,311 A * | 5/1990 | Neches et al. | ............... | 718/100 |
| 4,989,133 A * | 1/1991 | May et al. | .................. | 718/102 |
| 5,008,805 A * | 4/1991 | Fiebig et al. | ................. | 700/79 |
| 5,257,366 A * | 10/1993 | Adair et al. | .................... | 707/4 |
| 5,561,797 A | 10/1996 | Gilles et al. | ................ | 395/600 |
| 5,828,847 A | 10/1998 | Gehr et al. | ............ | 395/200.69 |
| 5,890,165 A | 3/1999 | Boudrie et al. | ............. | 707/202 |
| 5,978,875 A * | 11/1999 | Asano et al. | ............... | 710/107 |
| 5,991,809 A | 11/1999 | Kriegsman | .................. | 709/226 |
| 6,018,779 A * | 1/2000 | Blumenau | .................... | 710/68 |
| 6,112,221 A * | 8/2000 | Bender et al. | .............. | 718/102 |
| 6,148,306 A * | 11/2000 | Seidl et al. | ............... | 707/104.1 |
| 6,173,339 B1 * | 1/2001 | Yorimitsu | ....................... | 710/5 |
| 6,256,621 B1 * | 7/2001 | Tsuchida et al. | ............... | 707/2 |
| 6,334,159 B1 * | 12/2001 | Haupt | .......................... | 710/6 |
| 6,434,590 B1 * | 8/2002 | Blelloch et al. | ............ | 718/102 |
| 6,453,313 B1 * | 9/2002 | Klein et al. | .................... | 707/3 |
| 6,513,109 B1 * | 1/2003 | Gschwind et al. | .......... | 712/200 |
| 6,523,058 B1 * | 2/2003 | Fung et al. | ................. | 718/100 |
| 6,549,951 B1 * | 4/2003 | Hui et al. | .................... | 709/250 |
| 6,647,407 B1 * | 11/2003 | Rhoads et al. | ............. | 718/102 |
| 6,662,203 B1 * | 12/2003 | Kling et al. | ................ | 718/103 |
| 6,928,646 B1 * | 8/2005 | James et al. | ................ | 718/104 |

\* cited by examiner

*Primary Examiner*—Jason Cardone
*Assistant Examiner*—Thomas Duong
(74) *Attorney, Agent, or Firm*—Duke W. Yee; David A. Mims, Jr.; Wayne P. Bailey

(57) ABSTRACT

A data processing system and method for scheduling a sequential execution of multiple commands. The data processing system includes an environment which executes the commands concurrently. Execution of the plurality of commands is scheduled in the environment so that the commands execute sequentially in programming order. When the commands are scheduled, a first one of the commands in the order begins and completes executing prior to a second one of the commands in the order beginning executing. When scheduled, the commands execute in the environment sequentially in programming order. In order to execute the commands sequentially, a process is spawned within which to execute the command. The execution status of the process is checked periodically by checking a process table. When the process has completed executing, a new process is spawned within which to execute the next command in the sequential order.

30 Claims, 4 Drawing Sheets

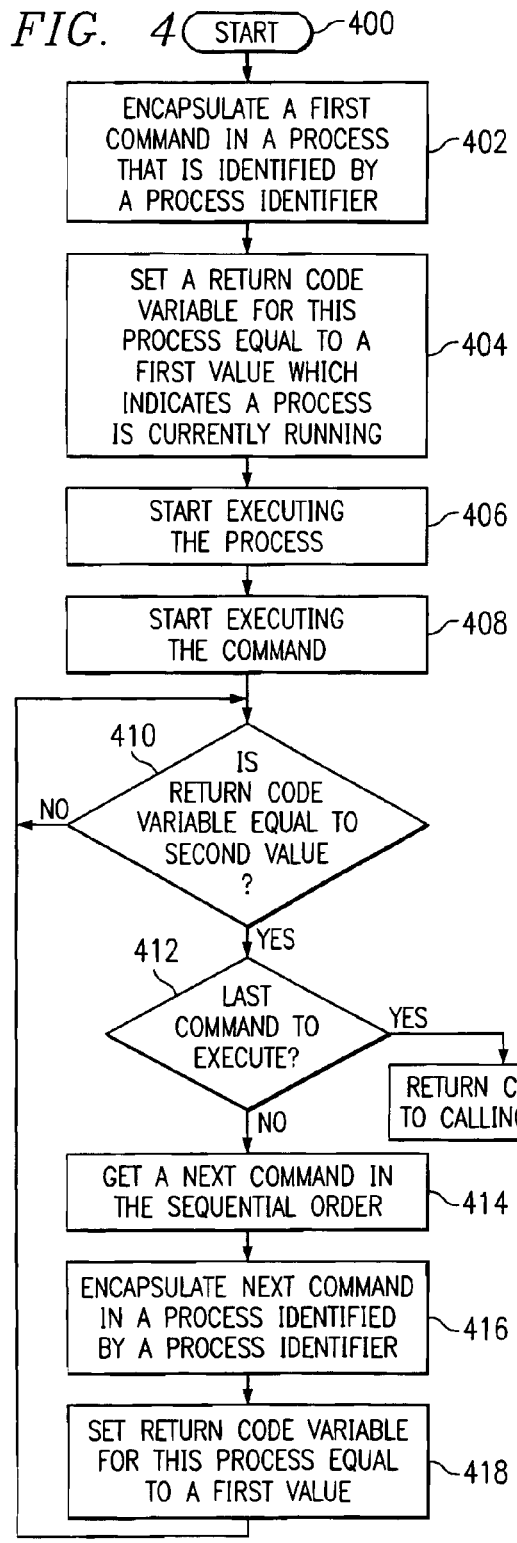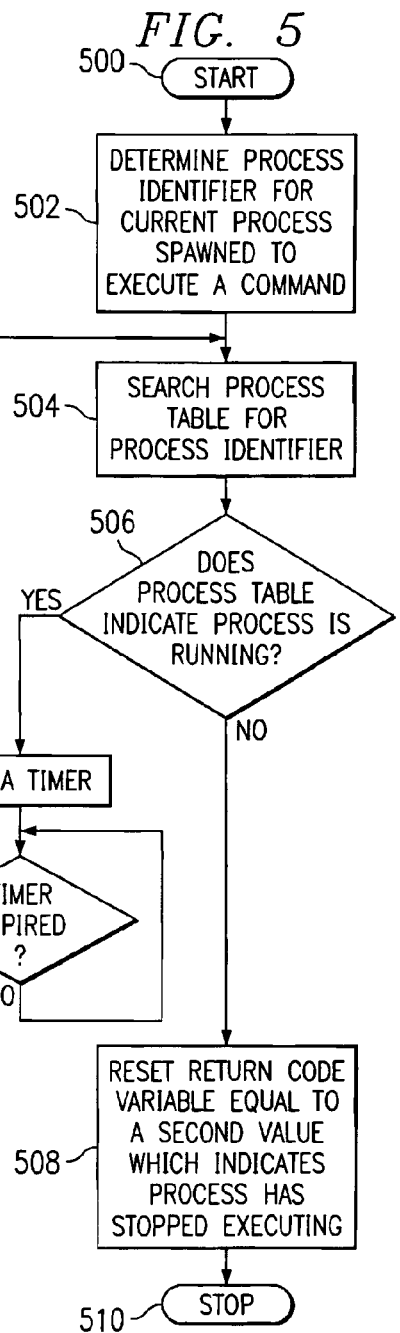

*FIG. 6*

```
y='date+%Y%m%d'
x='date+%0H%0M%0S'

date>>/tmp/scheduler.log
echo "Starting scheduler" >>/tmp/scheduler.log
------------------- date>>/tmp/scheduler.log
echo "Starting process # 1 ">>/tmp/scheduler.log
rc1=0
#insert command here for process #1
while[[$rc1 = 0]]
do
ps-ef|grep process#1|grep -v grep
if[[$? -ne 0]]
then rc1=1 else
sleep 600
fi
done date>>/tmp/scheduler.log
echo "Starting process # 2 ">>/tmp/scheduler.log
rc2=0
#insert command here for process #2
while[[$rc2 = 0]]
do
ps -ef|grep process#2|grep -v grep
if[[$? -ne 0]]
then rc2=1
else
sleep 120
fi
done date>>/tmp/scheduler.log
echo "Starting process # 3 ">>/tmp/scheduler.log
rc3=0
#insert command here for process #3
while[[$rc3 = 0]]
do
ps -ef|grep process#3|grep -v grep
if[[$? -ne 0]]
then rc3=1
else
sleep 120
fi
done
```

FIG. 7

```

#Example using this script with Tivoli Storage Manager (TSM)#

#echo "Starting DRMPhase1">>/tmp/drm.log
#------------------
#RUN DRMPHASE1 TO BACKUP STG, DB, DEVCONFIG, VOLHIST, ETC.

date>>/tmp/drm.log
echo "verifying that no node sessions are running">>/tmp/drm.log
rc1=0
while [[$rc1 = 0]]
do
dsmadmc -id=admin -password=admin "select session_id,session_type,client_name from
sessions where SESSION_TYPE='Node' and CLIENT_NAME!='ENTBKDAL1'">/dev/null if[[$? -ne 0]]
then rc1=1
else
sleep 600
fi
done date>>/tmp/drm.log
echo "Starting expire inventory">>/tmp/drm.log
rc2=0
dsmadmc -id=admin -password=admin 'expire inventory'
while [[$rc2 = 0]]
do
dsmadmc -id=admin -password=admin "select process_num,process from processes where
PROCESS='Expiration'">/dev/null
if[[$? -ne 0]]
then rc2=1
else
sleep 120
fi
done
```

APPARATUS AND METHODS FOR SEQUENTIALLY SCHEDULING A PLURALITY OF COMMANDS IN A PROCESSING ENVIRONMENT WHICH EXECUTES COMMANDS CONCURRENTLY

BACKGROUND OF THE INVENTION

1. Technical Field

The present invention relates to data processing systems, and further to a data processing system for scheduling, executing, and monitoring the execution of a plurality of commands in a data processing system which executes commands concurrently and which does not sense or test for the completion of execution of commands. More particularly, the present invention provides apparatus and methods for encapsulating each command in a process whose execution status is monitored so that the commands will execute sequentially wherein a first command will complete executing before beginning the executing of a next command.

2. Description of Related Art

At the lowest level of interaction between computer operating systems and applications, certain fundamental differences arise regarding the handling of processes. In some environments, processes, such as scripts, programs, or commands, operate in a sequential manner such that execution of one process is not started until the previous process has completed executing. In these systems, the result from the execution of one process is, therefore, available when subsequent processes begin executing.

In other environments, multiple processes may start executing generally simultaneously, i.e. concurrently. In these systems, the results of the execution of one process are not available to the other processes.

The environments which execute processes concurrently without regard for the status of execution of other processes suffer from some disadvantages. Branching logic and complex scripts cannot be constructed because the results of previously executed processes are not necessarily available to subsequent processes.

Thus, it would be beneficial to have an apparatus and method for scheduling and executing processes in a sequential order in an environment which executes processes concurrently.

SUMMARY OF THE INVENTION

A data processing system and method are disclosed for scheduling a sequential execution of multiple commands. The data processing system includes an environment which executes the commands concurrently. Without scheduling, each of the commands is executed in the environment without regard to a completion of execution of any other ones of the commands. Execution of the plurality of commands is scheduled in the environment so that the commands execute sequentially in programming order. When the commands are scheduled, a first one of the commands in the order begins and completes executing prior to a second one of the commands in the order beginning executing. When scheduled, the commands execute in the environment sequentially in programming order. In order to execute the commands sequentially, a process is spawned within which to execute the command. The execution status of the process is checked periodically by checking a process table. When the process has completed executing, i.e. when the command has completed executing, a new process is spawned within which to execute the next command in the sequential order.

Other features and advantages of the present invention will be described in, or will become apparent to those of ordinary skill in the art in view of the following detailed description of the preferred embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flow chart which illustrates the execution of a scheduler script in accordance with the present invention;

FIG. 5 is a flow chart which illustrates determining whether a process is currently executing and setting a return code variable in accordance with the present invention;

FIG. 6 depicts pseudo-code for a scheduler script in accordance with the present invention; and FIG. 7 illustrates pseudo-code for a scheduler script including TSM commands inserted in the script in accordance with the present invention.

DETAILED DESCRIPTION OF THE PREFERRED EMBODIMENTS

A preferred embodiment of the present invention and its advantages are better understood by referring to FIGS. 1–7 of the drawings, like numerals being used for like and corresponding parts of the accompanying drawings.

The present invention is a method and system for scheduling a plurality of commands to be executed sequentially in an environment which executes commands concurrently. In the environment of the present invention, commands are executed generally simultaneously. The environment starts executing each command without regard for the completion of execution of any other commands.

The present invention provides a method and system for scheduling commands in this type of environment whereby a command will complete executing before a next command begins executing. In this manner, branching and complex scripts may be written which will execute properly in such an environment.

A plurality of commands are selected which are to be executed in a particular sequential order. Each command is inserted into a scheduler script in the sequential order. The scheduler script will control and monitor the execution of the commands. The scheduler script is then executed.

When the scheduler script is executed, the first command in the sequential order will be encapsulated within a process. This process will receive a process identifier which uniquely identifies this particular process. The process will begin executing. The command encapsulated within the process will then execute after the process has started executing.

When the command has finished executing, the process will finish executing. When the process has finished executing, the next command in the scheduler script will be encapsulated in a new process and will be executed in a manner similar to that described above.

The scheduler script will determine whether the process is executing by checking a return code variable. The return code variable is set equal to a first value to indicate that a process is executing and set equal to a second value to indicate that a process is not executing. The return code variable is set equal to the first value when the process starts executing. Thereafter, a process table is checked periodically for the process identifier which identifies the current process. The process identifier for each process which is currently executing will appear in the process table. When the process table indicates that the process is not executing, the return code variable will be set equal to the second value.

Figure 1:
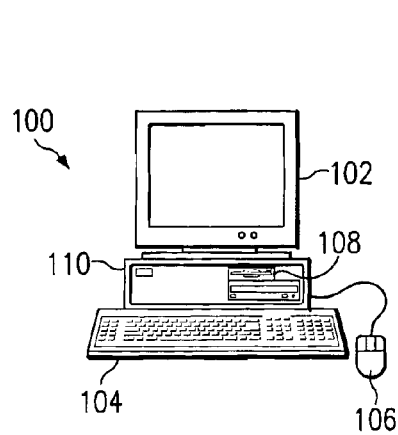
FIG. 1 is a pictorial representation of a data processing system according to the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
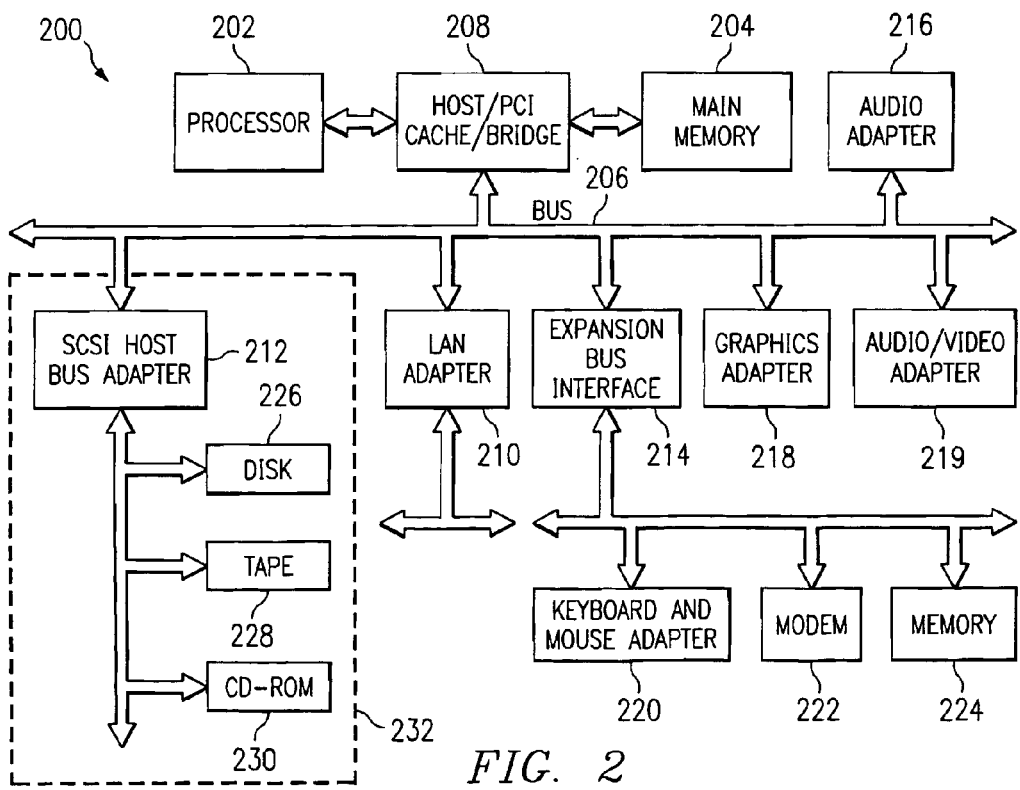
FIG. 2 is an exemplary block diagram of a data processing system according to the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as the AIX operating system available from International Business Machines. The AIX operating system is a UNIX-type operating system. In addition, other operating systems such as Windows 2000, available from Microsoft Corporation, or object oriented systems such as Java may run on data processing system 200. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Data processing system 200 includes an environment which executes commands concurrently. For example, data processing system 200 may include a Tivoli™ Storage System Manager (TSM) server system. TSM is a network backup and recovery tool that spans different manufacturers' platforms. TSM does not sense when a command has completed executing, and it does not test to determine when a command has completed executing. TSM executes commands concurrently. A process is spun off for each command generally simultaneously without regard for whether any others of the commands have finished executing.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 3:
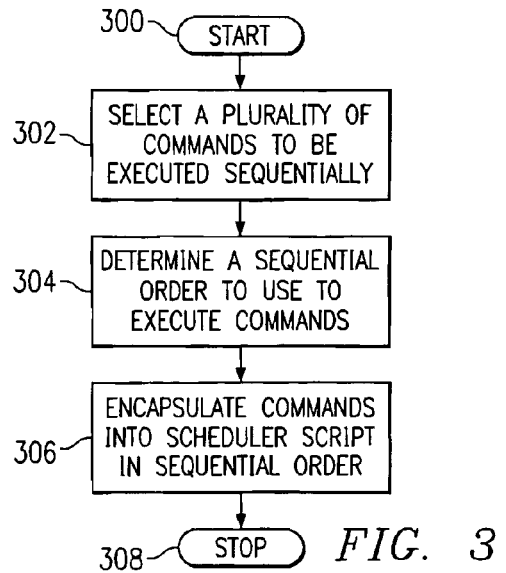
FIG. 3 is a flowchart which depicts the creation of a scheduler script to execute a plurality of commands sequentially in accordance with the present invention.

FIG. 3 a flowchart which depicts the creation of a scheduler script to execute a plurality of commands sequentially in accordance with the present invention. The process starts as depicted by block 300 and thereafter passes to block 302 which illustrates selecting a plurality of commands to be executed sequentially. Next, block 304 depicts determining a sequential order to use to execute the commands. Typically, the sequential order will be the programming order. Thereafter, block 306 illustrates inserting the commands into the scheduler script in the sequential order. The process then terminates as illustrated by block 308.

FIG. 4 is a flow chart which illustrates the execution of a scheduler script in accordance with the present invention. The process starts as depicted by block 400 and thereafter passes to block 402 which illustrates encapsulating a first command in a process that is identified by a process identifier. Next, block 404 depicts setting a return code variable for the process equal to a first value. The first value indicates that the process is currently executing. Thereafter, block 406 illustrates starting the execution of the process. Next, block 408 depicts starting the execution of the first command in response to starting the execution of the process. The command is executed within the process.

The process then passes to block 410 which illustrates a determination of whether or not the return code variable is equal to the second value. If a determination is made that the return code variable is not equal to the second value, the process passes back to block 410. Referring again to block 410, if a determination is made that the return code variable is equal to the second value, the process passes to block 412 which depicts a determination of whether or not this was the last command to execute. If a determination is made that this was not the last command to execute, the process passes to block 414 which illustrates getting a next command in the sequential order. The next command in the sequential order will be the next command in the scheduler script. The commands were originally inserted into the scheduler script in the sequential order. Thereafter, block 416 depicts encapsulating the next command in the sequential order in a process. This process is identified by its own, unique process identifier. Next, block 418 illustrates setting the return code variable equal to the first value for this process. The process then passes back to block 410.

Referring again to block 412, if a determination is made that this was the last command to execute, the process passes to block 420. Block 420 depicts returning control to the shell script which called this scheduler script.

FIG. 5 is a high level flow chart which depicts a determination of whether a process is currently executing and setting a return code variable in accordance with the present invention. The process starts as illustrated by block 500 and thereafter passes to block 502 which depicts determining the process identifier which identifies the current process spawned to execute a command. Next, block 504 illustrates searching a process table for this process identifier. Block 506, then, depicts a determination of whether or not the process table indicates that the process is currently running. While a process is running, the process identifier which identifies that process will appear in the process table. When the process has completed executing, the process identifier will be removed from the table and will no longer appear there.

Referring again to block 506, if a determination is made that the process table indicates that the process is not running, the process passes to block 508 which illustrates setting the return code variable equal to a second value. When the return code variable is set equal to the second value, the return code variable indicates that the process is not currently running. The process then terminates as depicted by block 510.

Referring again to block 506, if a determination is made that the process table indicates that the process is running, i.e. the process identifier for this process appears in the process table, the process passes to block 512. Block 512 illustrates setting a timer. Next, block 514 depicts a determination of whether or not the timer has expired. If a determination is made that the timer has not expired, the process loops back to block 514 until a determination is made that the timer has expired. Referring again to block 514, if a determination is made that the timer has expired, the process passes back to block 504 in order to again search the process table for the process identifier. In this manner, the process table is checked periodically to determine whether the process identifier appears in the table. The periods are determined by the length of time set using the timer.

FIG. 6 depicts pseudo-code for a scheduler script in accordance with the present invention. As depicted, a first command may be inserted into a first process. A second command may be inserted into a second process. And, a third command may be inserted into a third process. When the scheduler script is executed, the first process and first will be executed. When the first process is completed, the second process and second command will be executed. And, when the second process is complete, the third process and third command will be executed.

FIG. 7 illustrates pseudo-code for a scheduler script including TSM commands inserted in the script in accordance with the present invention.

In this manner, commands may be executed sequentially in an environment which executes commands concurrently. A scheduler script is provided which encapsulates each command in a process. The scheduler script then executes the process and monitors the current execution status of the process by monitoring a return code variable. The return code variable is set equal to a first value to indicate that a process is currently executing. A process table is checked to determine whether a process is currently executing. The process identifier for a process will appear in the process table when the process is currently executing. When the process identifier no longer appears in the process table, the return code variable is set equal to a second value to indicate that the process has completed executing. When the return code variable is set equal to the second value, the scheduler will get the next command and encapsulate it within a process. In this manner, the commands are executed sequentially where each command completes executing prior to commencing the execution of the next command in the sequential order.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for scheduling the execution of a plurality of commands, said data processing system including an environment which executes commands concurrently, wherein said commands are executed without regard to a completion of execution of any other ones of said commands, said method comprising the steps of:
    selecting said plurality of commands from the environment which executes commands concurrently;
    scheduling execution of said selected plurality of commands in a programming order, said scheduling step comprising:
        encapsulating a first one of said plurality of commands in a first process and encapsulating a second one of said plurality of commands in a second process;
        beginning processing of said first process;
        executing said first one of said plurality of commands in response to said beginning processing of said first process, wherein said first one of said plurality of commands executes only while said first process is executing; and
        beginning processing of said second process only in response to a completion of processing of said first process.

2. The method according to claim 1, further comprising the step of completing processing of said first process in response to a completion of execution of said first one of said plurality of commands.

3. The method according to claim 1, further comprising the step of executing said second one of said plurality of commands in response to said beginning processing of said second process.

4. The method according to claim 1, further comprising the step of determining whether said first process is currently executing.

5. The method according to claim 4, wherein said step of determining whether said first process is currently executing further comprises the steps of:
    establishing a return code variable for the first process; and
    utilizing said return code variable to indicate whether said first process is currently executing.

6. The method according to claim 5, wherein said step of determining whether said first process is currently executing further comprises the steps of:
    assigning a first process identifier to said first process; and
    utilizing said first process identifier to determine whether said first process is currently executing.

7. The method according to claim 6, further comprising the steps of:
    searching a process table for said first process identifier;
    determining that said first process is executing in response to locating said process identifier in said process table; and
    determining that said first process is not executing in response to a failure to locate said process identifier in said process table.

8. The method according to claim 7, further comprising the steps of:
    setting said return code variable equal to a first value while said first process is executing; and
    setting said return code variable equal to a second value when said first process has completed executing.

9. The method according to claim 8, further comprising the steps of:
    establishing a timer for said first process;
    starting said timer in response to executing said first process; and
    testing said return code variable to determine whether said return code variable is equal to said second value upon the expiration of said timer.

10. The method according to claim 1, wherein said first process and said second process are included in a script.

11. A data processing system for scheduling the execution of a plurality of commands, said data processing system including an environment which executes commands concurrently, wherein said commands are executed without regard to a completion of execution of any other ones of said commands, comprising:
    selecting means for selecting said plurality of commands from the environment which executes commands concurrently;
    a scheduler for scheduling execution of said selected plurality of commands in said environment, said scheduler comprising:
        means for encapsulating a first one of said plurality of commands in a first process and encapsulating a second one of said plurality of commands in a second process;
        means for beginning processing of said first process;
        means for executing said first one of said plurality of commands in response to said beginning processing of said first process, wherein said first one of said plurality of commands executes only while said first process is executing; and
        means for beginning processing of said second process only in response to a completion of processing of said first process.

12. The system according to claim 11, further comprising means for completing processing of said first process in response to a completion of execution of said first one of said plurality of commands.

13. The system according to claim 11, further comprising means for executing said second one of said plurality of commands in response to said beginning processing of said second process.

14. The system according to claim 11, further comprising means for determining whether said first process is currently executing.

15. The system according to claim 14, wherein said means for determining whether said first process is currently executing further comprises:
    means for establishing a return code variable for the first process; and
    means for utilizing said return code variable to indicate whether said first process is currently executing.

16. The system according to claim 15, wherein said means for determining whether said first process is currently executing further comprises:
    means for assigning a first process identifier to said first process; and means for utilizing said first process identifier to determine whether said first process is currently executing.

17. The system according to claim 16, further comprising:
means for searching a process table for said first process identifier;
means for determining that said first process is executing in response to locating said process identifier in said process table; and
means for determining that said first process is not executing in response to a failure to locate said process identifier in said process table.

18. The system according to claim 17, further comprising:
means for setting said return code variable equal to a first value while said first process is executing; and
means for setting said return code variable equal to a second value when said first process has completed executing.

19. The system according to claim 18, further comprising:
means for establishing a timer for said first process;
means for starting said timer in response to executing said first process; and
means for testing said return code variable to determine whether said return code variable is equal to said second value upon the expiration of said timer.

20. The system according to claim 11, wherein said first process and said second process are included in a script.

21. A computer program product stored on a recordable-type media for scheduling the execution of a plurality of commands, said data processing system including an environment which executes commands concurrently, wherein said commands are executed without regard to a completion of execution of any other ones of said commands, said computer program product comprising:
selecting means for selecting said plurality of commands from the environment which executes commands concurrently;
a scheduler for scheduling execution of said selected plurality of commands in said environment, said scheduler comprising:
instruction means for encapsulating a first one of said plurality of commands in a first process and encapsulating a second one of said plurality of commands in a second process;
instruction means for beginning processing of said first process;
instruction means for executing said first one of said plurality of commands in response to said beginning processing of said first process, wherein said first one of said plurality of commands executes only while said first process is executing; and
instruction means for beginning processing of said second process only in response to a completion of processing of said first process.

22. The computer program product stored on a recordable-type media according to claim 21, further comprising instruction means for completing processing of said first process in response to a completion of execution of said first one of said plurality of commands.

23. The computer program product stored on a recordable-type media according to claim 21, further comprising instruction means for executing said second one of said plurality of commands in response to said beginning processing of said second process.

24. The computer program product stored on a recordable-type media according to claim 21, further comprising instruction means for determining whether said first process is currently executing.

25. The computer program product stored on a recordable-type media according to claim 24, wherein said instruction means for determining whether said first process is currently executing further comprises:
instruction means for establishing a return code variable for the first process; and
instruction means for utilizing said return code variable to indicate whether said first process is currently executing.

26. The computer program product stored on a recordable-type media according to claim 25, wherein said instruction means for determining whether said first process is currently executing further comprises:
instruction means for assigning a first process identifier to said first process; and
instruction means for utilizing said first process identifier to determine whether said first process is currently executing.

27. The computer program product stored on a recordable-type media according to claim 26, further comprising:
instruction means for searching a process table for said first process identifier;
instruction means for determining that said first process is executing in response to locating said process identifier in said process table; and
instruction means for determining that said first process is not executing in response to a failure to locate said process identifier in said process table.

28. The computer program product stored on a recordable-type media according to claim 27, further comprising:
instruction means for setting said return code variable equal to a first value while said first process is executing; and
instruction means for setting said return code variable equal to a second value when said first process has completed executing.

29. The computer program product stored on a recordable-type media according to claim 28, further comprising:
instruction means for establishing a timer for said first process;
instruction means for starting said timer in response to executing said first process; and
instruction means for testing said return code variable to determine whether said return code variable is equal to said second value upon the expiration of said timer.

30. The computer program product stored on a recordable-type media according to claim 21, wherein said first process and said second process are included in a script.

* * * * *